United States Patent [19]

Okita et al.

[11] Patent Number: 4,672,002

[45] Date of Patent: Jun. 9, 1987

[54] MAGNETIC RECORDING MEDIUM

[75] Inventors: Tsutomu Okita; Nobuo Tsuji; Yoshito Mukaida, all of Kanagawa, Japan

[73] Assignee: Fuji Photo Film Co., Ltd., Kanagawa, Japan

[21] Appl. No.: 598,098

[22] Filed: Apr. 9, 1984

[30] Foreign Application Priority Data

Apr. 7, 1983 [JP] Japan ................................ 58-61290
Apr. 11, 1983 [JP] Japan ................................ 58-63410

[51] Int. Cl.$^4$ ............................................. G11B 5/702
[52] U.S. Cl. ............................ 428/425.9; 252/62.54; 427/44; 427/128; 428/522; 428/694; 428/900
[58] Field of Search ................. 427/44, 128, 130, 131; 428/694, 695, 900, 522, 425.9, 336; 360/134–136; 252/62.54

[56] References Cited

U.S. PATENT DOCUMENTS

| | | | |
|---|---|---|---|
| 4,004,997 | 1/1977 | Tsukamoto | 428/900 |
| 4,092,173 | 5/1978 | Novak | 427/44 |
| 4,343,831 | 8/1982 | Tsuji | 427/44 |
| 4,407,853 | 10/1983 | Okita | 427/44 |
| 4,428,974 | 1/1984 | Okita | 427/44 |
| 4,448,848 | 5/1984 | Okita | 427/44 |
| 4,560,616 | 12/1985 | Okita | 427/44 |
| 4,576,866 | 3/1986 | Okita | 427/44 |
| 4,619,868 | 10/1986 | Okita | 428/900 |

FOREIGN PATENT DOCUMENTS 128711  10/1982  Japan .

*Primary Examiner*—Ellis P. Robinson
*Attorney, Agent, or Firm*—Sughrue, Mion, Zinn, Macpeak, and Seas

[57] ABSTRACT

A magnetic recording medium comprising a support having coated thereon a magnetic layer is disclosed. The magnetic layer contains, as a binder, a composition cured with electron beam comprising (a) at least one of vinyl chloride-vinyl acetate type resins containing $5 \times 10^{-5}$ to $1.7 \times 10^{-3}$ equivalents of a carboxyl group per gram of the polymer and introcellulose resins, (b) a urethane resin and (c) at least one compound selected from the group consisting of aromatic or alicyclic compounds containing at least two vinyl linkages in the molecule and acryloyl-modified polyisocyanate compounds. The magnetic recording medium has excellent electromagnetic properties and durability.

12 Claims, No Drawings

MAGNETIC RECORDING MEDIUM

BACKGROUND OF THE INVENTION

This invention relates to a magnetic recording medium such as video tape, audio tape, computer data tape, etc. More particularly, the invention relates to such a medium with a novel binder which is curable by electron beam radiation.

Magnetic recording media currently used in various recording equipment use, as a binder, thermoplastic resins, such as vinyl chloride-vinyl acetate type resin, vinyl chloride-vinylidene chloride type resin, cullulosic resin, acetal resin, urethane resin, acrylonitrile butadiene resin, etc., alone or in combination as described in, for example, U.S. Pat. Nos. 3,634,137, 4,238,548 and 4,307,154. However, the use of these thermoplastic resins as binders has a disadvantage that wear resistance of a magnetic layer is poor to the extent that it can contaminate the tape guiding systems during tape running.

Further, a process of using a thermosetting resin such as melamine resins or urea resins or a process of adding a binder capable of crosslinking upon chemical reaction, such as an isocyanate compound and an epoxy compound, to the above-described thermosetting resin is also known as described in, for example, U.S. Pat. Nos. 4,049,871, 4,154,895 and 4,333,988. However, the use of the crosslinkable binder deteriorates storage stability of a resin solution in which magnetic powders are dispersed, i.e., shortens the pot life of the resin solution. In other words, the magnetic coating composition cannot be maintained uniform in property, resulting in poor uniformity of the magnetic tape. Further, after coating and drying the magnetic coating composition, heat treatment is necessary for curing a coating layer thereby requiring a long period of time for the production of magnetic recording media.

In order to eliminate the above-described disadvantages, a method has been proposed wherein a magnetic recording medium is produced by using a combination of an acrylate oligomer and an acrylate type monomer as a binder and curing the binder by electron beam radiation as disclosed in Japanese Patent Publication No. 12423/72 and Japanese Patent Application (OPI) (Open to Public Inspection) Nos. 13639/72, 15104/72 and 77433/75. Further, a technique of using a binder comprising a thermoplastic resin and an electron beam-curing resin as described in, for example, U.S. Pat. Nos. 3,871,908, 4,004,997 and 4,343,861 is disclosed in Japanese Patent Application (OPI) Nos. 25231/81, 86130/82, 86131/82 and 127926/82. These improved processes, however, failed to produce magnetic recording media having high electromagnetic properties and running durability.

Recently, it has been desired that a support for magnetic tapes be made thinner for achieving long-time recording and that the dynamic properties of the magnetic layer be improved. Further, an improvement in dispersibility of a magnetic powder has been required to attain high density recording. However, the above-described conventional techniques could not impart the properties that satisfy the above requirements for a magnetic layer.

The inventors have extensively investigated to eliminate the disadvantages associated with the conventional techniques such as a process of using a thermoplastic resin or a thermosetting resin, a process of adding a binder crosslinkable by chemical reaction, or a process of using a binder capable of hardening upon electron beam crosslinking and, as a result, reached the present invention.

SUMMARY OF THE INVENTION

An object of the present invention is to provide a magnetic recording medium having excellent electromagnetic properties.

Another object of the present invention is to provide a magnetic recording medium having a magnetic layer excellent in durability.

A further object of the present invention is to provide a magnetic recording medium coated with a magnetic coating composition which is stable and homogeneous during storage.

A still further object of the present invention is to provide a magnetic recording medium which does not contaminate the tape guiding systems.

A yet further object of the present invention is to provide a magnetic recording medium which is prepared without requiring a heat treatment step for curing a coated layer.

As a result of extensive researches it has been found that the above objects of the present invention can be achieved using a binder comprising (a) a vinyl chloride-vinyl acetate type polymer or nitrocellulose resin, (b) a urethane resin and (c) at least one compound selected from the group consisting of aromatic or alicyclic compounds containing at least two vinyl linkages and acryloyl-modified polyisocyanate compounds and curing the binder with electron beam. It has also been found that due to the synergistic effects of these resin components, magnetic recording media having greatly improved electromagnetic properties and excellent running properties and durability can be obtained.

The present invention is based on the above findings and provides a magnetic recording medium comprising a support having coated thereon a magnetic layer, said magnetic layer containing, as a binder, a composition cured by electron beam comprising (a) at least one resin selected from the group consisting of vinyl chloride-vinyl acetate type resins containing $5 \times 10^{-5}$ to $1.7 \times 10^{-3}$ equivalents of a carboxyl group per gram of the polymer and nitrocellulose resins, (b) a urethane resin and (c) at least one compound selected from the group consisting of aromatic or alicyclic compounds containing at least two vinyl linkages in the molecule and isocyanate compounds having at least two isocyanato groups with the isocyanato groups being modified with (meth)acryloyl.

DETAILED DESCRIPTION OF THE INVENTION

The term "(meth)acryloyl" as used herein is referred to an acryloyl group or a methacryloyl group or both of them.

Examples of the component (a) include a vinyl chloride-vinyl acetate-maleic acid copolymer, a vinyl chloride-vinyl acetate-propionic acid copolymer, nitrocellulose resin, etc., with a vinyl chloride-vinyl acetate-maleic acid copolymer and cellulose dinitrate being particularly preferred. Of the component (a), the vinyl chloride-vinyl acetate type copolymers contain $5 \times 10^{-5}$ to $1.7 \times 10^{-3}$ equivalents, and preferably $3 \times 10^{-4}$ to $1 \times 10^{-3}$ equivalents, of a carboxyl group per gram of the polymer. With a carboxyl equivalent out of this range, the electromagnetic properties of the resulting magnetic recording medium are noticeably reduced. It is preferred for the nitrocellulose resin to have about 2 nitro groups per mole of the constituent glucose and a degree of nitration of about 10.7 to about 12.2%. It is also preferred that the nitrocellulose show a viscosity of about 0.1 to 4 poise when measured as a 10% ethyl acetate solution. It is preferred for the component (a) to have a number average molecular weight of about 10,000 to about 100,000.

The component (b), urethane resins, may be of a polyether type or polyester type. A preferred molecular weight of the urethane resin is in the range of from 5,000 to 500,000, particularly 10,000 to 200,000. If the molecular weight of the urethane resin is out of this range, dispersibility of the magnetic powder in the magnetic coating composition is deteriorated.

Component (c) may be aromatic or alicyclic compounds having at least two vinyl linkages in the molecule, for example, vinyl and allyl compounds, e.g., divinylbenzene, diallyl phthalate, triallyl cyanurate, triallyl isocyanurate, triallyl trimellitate, etc.; poly(meth)acrylate) of cyclohexanediol, hydroxybenzyl alcohol, decalindiol, 1,5-dihydroxy-1,2,3,4-tetrahydronaphthalene, 2,2'-diphenyl-1,3-propanediol, 2,2'-bis(4-hydroxyethoxyphenyl)propane, 2,2'-bis(4-hydroxypolyethoxyphenyl)propane, 2,2'-bis(4-hydroxypolyethoxycyclohexyl)propane, tris(2-hydroxyethyl)isocyanurate, etc.; and the like. Among these, those compounds having at least two acryloyl groups in the molecule, for example, 1,4-diacryloyloxycyclohexane, 2,2'-diphenyl-1,3-diacryloyloxypropane, and tris(2-acryloyloxyethl)isocyanurate, are preferred since acryloyl is more reactive than methacryloyl. It is preferred for the component (c) to have a molecular weight of about 500 to about 2,000. These aromatic or alicyclic compounds may be used alone or in combination.

Examples of the polyisocyanate compounds having (meth)acryloyl-modified isocyanato groups are poly(meth)acrylate compounds obtained by the reaction between a polyisocyanate, such as tolylene diisocyanate, naphthylene-1,5-diisocyanate, o-toluylene diisocyanate, diphenylmethane diisocyanate, triphenylmethane triisocyanate, hexamethylene diisocyanate, isophorone diisocyanate, xylene diisocyanate, a 1:3 adduct of trimethylol propane and tolylene diisocyanate, etc., and a (meth)acrylic acid ester containing a hydroxyl group, such as 2-hydroxyethyl acrylate, 4-hydroxybutyl acrylate, etc. These acryloyl-modified polyisocyanate compounds may be used alone or as an admixture thereof.

In addition to the foregoing binder components (a) to (c), the binder composition may further contain a compound having one unsaturated carbon-carbon bond in its molecule and being cabable of being polymerized with an electron beam. Preferably, the unsaturated compounds have about 3 to about 20 carbon atoms. Examples of the compounds include acrylic acid, itaconic acid, methyl acrylate and its alkyl homologues (alkyl acrylates), styrene and its homologues such as α-methylstyrene and β-chlorostyrene, acrylonitrile, acrylamide, vinyl acetate, vinyl propionate, N-vinylpyrrolidone, etc. Those compounds described in *Kankosei Jushi Data Shu* (Collection of Data on Photosensitive Resins) published by Kabushiki Kaisha Sogo Kagaku Kenkyusho pp. 235–236 (December 1968) can also be used. The amount of the unsaturated compound which can be used is 15% or less based on the total weight of the binder.

The mixing ratio of the component (a) and the component (b) preferably falls within a range of from 20:80 to 90:10 (parts by weight) and more preferably from 40:60 to 85:15 (parts by weight). If the content of the component (a) or (b) is outside the above specified range, durability of the magnetic layer cannot be obtained. The component (c) is preferably used in an amount of from 15 to 200 parts by weight, and more preferably from 20 to 100 parts by weight, per 100 parts by weight of the sum of the component (a) and the component (b). When the amount of the component (c) exceeds the above upper limit, the amount of the electron beam required for curing becomes unfavorably large and, if it is less than the lower limit, insufficient crosslinking results and thus satisfactory durability of the resulting magnetic recording medium cannot be obtained.

Ferromagnetic powders that can be used in the present invention include ferromagnetic iron oxide fine powders, Co-dopped ferromagnetic iron oxide fine powders, ferromagnetic chromium dioxide fine powders, ferromagnetic alloy fine powders, barium ferrite and so on. Effective ferromagnetic iron oxide and chromium dioxide have an acicular ratio of from about 2/1 to about 20/1, preferably not less than 5/1, and an average length of from about 0.2 to about 2.0 μm. The ferromagnetic alloy fine powders generally have a metal content of not less than 75 wt%, with 80 wt% or more of the metal content being a ferromagnetic metal, i.e., Fe, Co, Ni, Fe-Co, Fe-Ni or Fe-Co-Ni, and have a longer diameter of not more than about 1.0 μm. These acicular ferromagnetic powders are described in, for example, U.S. Pat. Nos. 3,026,215, 3,031,341, 3,100,194, 3,242,005 and 3,389,014.

Organic solvents which can be used for the magnetic coating composition include ketones, e.g., acetone, methyl ethyl ketone, methyl isobutyl ketone, cyclohexanone, etc.; esters, e.g., methyl acetate, ethyl acetate, butyl acetate, ethyl lactate, monoethyl ether glycol acetate, etc.; ethers, e.g., diethyl ether, tetrahydrofuran, glycol dimethyl ether, glycol monoethyl ether, dioxane, etc.; aromatic hydrocarbons, e.g., benzene, toluene, xylene, etc.; chlorinated hydrocarbons, e.g., methylene chloride, ethylene chloride, carbon tetrachloride, chloroform, ethyl chlorohydrin, dichlorobenzene, etc.; and the like. Of these, methyl ethyl ketone, methyl isobutyl ketone, cyclohexanone, ethyl acetate, butyl acetate, tetrahydrofuran, toluene, xylene, etc. are preferred.

The magnetic coating composition of the present invention may further contain additives such as a lubricant, an abrasive, a dispersing agent, an antistatic agent and a rust inhibitor. The lubricant includes saturated or unsaturated higher fatty acids such as lauric acid, myristic acid, stearic acid, eicosanoic acid, oleic acid, rinolic acid, erucic acid, etc., higher fatty acid esters such as butyl laurate, hexyl laurate, ethyl myristate, butyl myristate, ethyl stearate, butyl stearate, ethyl oleate, butyl oleate, etc., higher fatty acid amides such as laurylamide, myristylamide, stearylamide, etc., higher alcohols such as stearyl alcohol, myristyl alcohol, etc., silicone oil, higher fatty acid-modified silicones, mineral oils, edible oils such as whale oil, shark oil, rape oil, soybean oil, etc. and fluorine type compounds. By the term "higher" as used herein it is meant that 10 or more, preferably 12 or more carbon atoms are contained.

The abrasive includes $Cr_2O_3$, $\alpha$-$Al_2O_3$, carborundum, garnet, emery, etc.

The dispersing agent includes nonionic surfactants such as alkylene oxide derivatives, glycerol derivatives, glycidol derivatives, etc., cationic surfactants such as higher alkylamines, quaternary ammonium salts, phosphoniums, sulfoniums, etc., anionic surfactants such as carboxylic acids, sulfonic acids, phosphoric acid, etc., amphoteric surfactants such as amino acids, aminosulfonic acids, etc., coupling agents such as silane coupling agents, titanium coupling agents. etc.

The anitistatic agent includes carbon black, carbon black graft polymers, and the compounds described above as the dispersing agent.

These additives may be added when the coating composition is prepared. The lubricant may also be coated or sprayed on the surface of a magnetic layer either as they are or as dissolved in an organic solvent after drying, smoothing the magnetic layer or curing the magnetic layer with electron beam radiation.

Materials for the support on which the magnetic coating composition is coated include polyesters, e.g., polyethylene terephthalate, polyethylene-2,6-naphthalate, etc.; polyolefines, e.g., polyethylene, polypropylene, etc.; cellulose derivatives, e.g., cellulose triacetate, etc.; plastics, e.g., polycarbonate, polyimide, polyamide-imide, etc.; non-magnetic metals that are used if desired, e.g., aluminum, copper, tin, zinc, or a non-magnetic alloy including these metals; plastics on which a metal, e.g., aluminum, is deposited; paper or paper coated or laminated with polyolefins; and so on. Of these, polyethylene terephthalate, polyethylene-2,6-naphthalate, polyimides, etc. are preferred.

The non-magnetic support may be in the form of a film, a tape, a sheet, a disc, a card or a drum, and various materials can be selected according to the final use.

A backcoat as described in, for example, U.S. Pat. Nos. 3,041,196, 3,166,688, 3,293,066, 3,617,378, 3,761,311, etc. can be provided on the support on the opposite side of the magnetic layer for the purpose of preventing charging, transferring and wow flutter, improving the strength of the magnetic recording medium and for making the back side of the support matted.

A scanning method, a double scanning method, a curtain beam method or a broad beam curtain method as described in, for example, U.S. Pat. Nos. 3,702,412, 3,745,396, 3,769,600, 3,848,153, 4,252,413, etc. can be used for accelerating electron beams.

The electron beam used has an accelerating voltage of 100 to 1000 KV, preferably 150 to 300 KV. The absorption dose is 1 to 20 megarad, preferably 3 to 15 megarad. If the accelerating voltage is less than 100 KV, the transmitted amount of energy is insufficient and, if it exceeds 1000 KV, the energy efficiency used for polymerization is lowered, making the process uneconomical. If the absorption dose is less than 1 magarad, the curing reaction is insufficient for obtaining a magnetic layer having a satisfactory mechanical strength and, if the absorption dose is more than 20 megarad, the energy efficiency used for curing is lowered or a radiated object generates heat and the support, particularly a plastic support, may be deformed.

The present invention will now be illustrated in greater detail by way of the following examples and comparative examples. However, the scope of the invention is not to be construed as being limited to these examples. In these examples, all parts are by weight unless otherwise indicated.

EXAMPLE 1

$\gamma$-$Fe_2O_3$: 400 parts
Vinyl chloride-vinyl acetate maleic acid copolymer (COOH content: $3.4 \times 10^{-4}$ equivalents per gram of the polymer): 45 parts
Urethane resin (a condensation product of adipic acid, butane diol and tolylene diisocyanate): 20 parts
2,2'-Bis(4-acryloyloxyphenyl)propane: 35 parts
Lecithine: 4 parts
Stearic acid: 4 parts
Butyl stearate: 4 parts
Carbon black: 10 parts
$\alpha$-$Al_2O_3$: 4 parts
Methyl ethyl ketone: 1000 parts The above components were kneaded in a ball mill for 50 hours to prepare a magnetic coating composition, which was then coated by a doctor blade on a polyethylene terephthalate support having a thickness of 15 to a dry thickness of $5\mu$. The coated layer was subjected to orientation with a cobalt magnet and the solvent was evaporated at 100° C. for 1 minute. The coated layer was then subjected to a smoothing treatment with calendar rolls composed of five pairs of rolls, with each pair including a cotton roll and a mirror roll (roll temperature: 60° C.). An electron beam with an accelerating voltage of 200 KV and a beam current of 10 mA was radiated so that the absorption dose was 10 Mrad. This sample was designated as Sample No. 1.

COMPARATIVE EXAMPLE 1

The same procedure as described in Example 1 was repeated except that the following composition was used as a binder instead of the binder components used in Example 1 and that the roll temperature of the calendar treatment was 30 C. The resulting product was designated as Sample No. 2.
Urethane resin (the same as used in Example 1): 65 parts
2,2'-Bis(4-acryloyloxyethoxyphenyl)propane: 35 parts

COMPARATIVE EXAMPLE 2

The same procedure as described in Example 1 was repeated except that the following composition was used as a binder instead of the binder components used in Example 1 and that the roll temperature of the calendar treatment was 60° C. The resulting product was designated as Sample No. 3.
Vinyl chloride-vinyl acetate-maleic acid copolymer (the same as used in Example 1): 65 parts
2,2'-Bis(4-acryloyloyxethoxyphenyl)propane: 35 parts

COMPARATIVE EXAMPLE 3

The same procedure as described in Example 1 was repeated except that the following composition was used as a binder instead of the binder components used in Example 1.
Vinyl chloride-vinyl acetate vinyl alcohol copolymer: 45 parts
Urethane resin (the same as used in Example 1): 20 parts
Trimethylolpropane triacrylate: 35 parts

EXAMPLE 2

The same procedure as described in Example 1 was repeated except that the following composition was used as a binder instead of the binder components used in Example 1 to obtain Sample No. 5

Vinyl chloride-vinyl acetate-maleic acid copolymer (COOH content: $1 \times 10^{-5}$ equivalents per gram of the polymer): 40 parts
Urethane resin: 30 parts
Tris($\beta$-acryloyloxyethyl)isocyanurate: 30 parts

EXAMPLE 3

The same procedure as described in Example 1 was repeated except that the following composition was used as a binder instead of the binder components used in Example 1 to obtain Sample No. 6.
Nitrocellulose resin (trade name "RS1/2H" produced by Daicel Chemical Industries Ltd.): 40 parts
Urethane resin: 40 parts
Cyclohexane diacrylate: 40 parts Each of Sample Nos. 1 to 6 as above prepared was run on a video tape recorder and evaluated for the video sensitivity, still life at still mode and contamination of the video head after 100 passes.

The video sensitivity was determined by recording gray signals of 50% set-up on the sample video tape using a VHS type video tape recorder ("NV 8200" type manufactured by Matsushita Electric Industries Co., Ltd.), and measuring the video sensitivity using an S/N meter ("925C" type manufactured by Shibasoku Co., Ltd.). The video sensitivity was expressed by a relative value taking the result of Sample No. 1 as 0 dB.

The still life was determined by recording predetermined video signals on the sample video tape using a VHS type video tape recorder ("HR 3600" type manufactured by Victor Co., Ltd.), and measuring the period of time until the reproduced still images loose their clearness.

The contamination of the video head after 100 passes was evaluated by loading a VHS type video cassette half with the sample tape and repeatedly running the tape for 100 passes using NV 8200. The scales for the evaluation are as follows:
O: No contamination of the video head was observed.
X: Slight contamination of the video head was observed.
XX: Serious contamination of the video head was observed.

The result of the determination obtained are shown in Table 1 below.

TABLE 1

| Sample No. | Video Sensitivity (dB) | Still Life (min) | Contamination of Video Head |
|---|---|---|---|
| 1 | +0.0 | >60 | O |
| 2 | −4.0 | 3 | The tape run stopped during the 25th pass |
| 3 | −1.0 | 5 | X |
| 4 | −2.0 | 15 | X |
| 5 | −0.1 | >60 | O |
| 6 | +0.2 | >60 | O |

It can be seen from the results shown in Table 1 that the video tapes according to the present invention are excellent in electromagnetic properties and durability.

EXAMPLE 4

The same procedure as described in Example 1 was repeated except that the following composition was used as a binder instead of the binder components used in Example 1 to prepare Sample No. 7
$\gamma$-Fe$_2$O$_3$: 400 parts
Vinyl chloride-vinyl acetate-maleic acid copolymer (COOH content: $3.4 \times 10^{-4}$ equivalents per gram of the polymer): 40 parts
Urethane resin (a condensation product of adipic acid, butane diol and tolylene diisocyanate): 20 parts
CH$_2$=CHCO$_2$CH$_2$CH$_2$OCONH(CH$_2$)$_6$NH—CO$_2$CH$_2$CH$_2$OCOCH=CH$_2$: 40 parts
Lecithine: 4 parts
Stearic acid: 4 parts
Butyl stearate: 4 parts
$\alpha$-Al$_2$O$_3$: 4 parts
Carbon black: 10 parts
Methyl ethyl ketone: 1000 parts

COMPARATIVE EXAMPLE 4

The same procedure as described in Example 1 was repeated except that the following composition was used as a binder in place of the binder components as used in Example 1 to obtain Sample No. 8.
Vinyl chloride-vinyl acetate-maleic acid copolymer (the same as used in Example 4): 40 parts
Urethane resin (the same as used in Example 4): 20 parts
Tetraethylene glycol diacrylate: 40 parts

COMPARATIVE EXAMPLE 5

The same procedure as described in Example 1 was repeated using the same composition as used in Example 4 except that a vinyl chloride-vinyl acetate-vinyl alcohol copolymer (vinyl alcohol content: 4%) was used in place of the vinyl chloride-vinyl acetate-maleic acid copolymer as used in Example 4 thereby obtaining Sample No. 9.

EXAMPLE 5

The same procedure as described in Example 1 was repeated except that the following composition was used as a binder in place of the binder components used in Example 1 to obtain Sample No. 10.

| | |
|---|---|
| Vinyl chloride-vinyl acetate-maleic acid copolymer (COOH content: $1 \times 10^{-5}$ equivalents per gram of the polymer) | 40 parts |
| Urethane resin | 30 parts |
| CH$_2$OCONH—C$_6$H$_3$(CH$_3$)—NHCOOCH$_2$CH$_2$OCOCH=CH$_2$<br>\|<br>CHOCONH—C$_6$H$_3$(CH$_3$)—NHCOOCH$_2$CH$_2$OCOCH=CH$_2$<br>\|<br>CH$_2$OCONH—C$_6$H$_3$(CH$_3$)—NHCOOCH$_2$CH$_2$OCOCH=CH$_2$ | 30 parts |

Tape mode from Sample Nos. 7 to 10 as prepared above were run on a video tape recorder and evaluated for video sensitivity, video S/N contamination of the video head after 100 passes and video sensitivity after 100 passes.

The video sensitivity and video S/N were determined by recording gray signals of 50% set-up on the sample video tape using a VHS tape video tape recorder ("NV 8200" type) and measuring the video sensitivity and video S/N using an S/N meter ("925C" type). The video sensitivity and video S/N were expressed as relative values taking the results of Sample No. 7 as 0 dB, respectively.

The video sensitivity after 100 passes indicates the reduction of power output taking the initial power output of each sample as the standard (i.e., 0 dB).

The method for determining the contamination of the video head and the scales therefor are the same as described with respect to Sample Nos. 1 to 6.

The results obtained are shown in Table 2 below.

TABLE 2

| Sample No. | Video Sensitivity (dB) | Video S/N (dB) | Contamination of Video Head After 100 Passes | Video Sensitivity After 100 Passes (dB) |
|---|---|---|---|---|
| 7 | +0.0 | +0.0 | O | +0.0 |
| 8 | −0.5 | −1.5 | X | −1.0 |
| 9 | −2.0 | −2.5 | O | −2.0 |
| 10 | −0.1 | +0.1 | O | +0.1 |

The scales for the evaluation are as defined above.

The result of Table 2 clearly demonstrate the superiority of the magnetic recording media of the present invention with respect to its electromagnetic properties of durability.

While the present invention has been described in detail and with reference to specific embodiments thereof, it will be apparent to one skilled in the art that various changes and modifications can be made therein without departing from the spirit and scope thereof.

What is claimed is:

1. A magnetic recording medium comprising:
   a support base having coated thereon:
      a magnetic layer, the magnetic layer containing, as a binder, a composition cured by electron beams, comprising:
         (a) a vinyl chloride-vinyl acetate type resin containing $5 \times 10^{-5}$ to $1.7 \times 10^{-3}$ equivalents of a carboxyl group per gram of the polymer;
         (b) an urethane resin; and
         (c) at least one compound selected from the group consisting of aromatic or alicyclic compounds containing at least two vinyl linkages in the molecule and isocyanate compounds having at least two isocyanato groups, with the isocyanato groups being modified with an acryloyl group and/or a methacryloyl group, wherein the ratio of the component (a) to the component (b) is in the range of 20:80 to 90:10 parts by weight and wherein the component (c) is present in an amount of 15 to 200 parts by weight per 100 parts by weight of the sum of the component (a) and the component (b).

2. A magnetic recording medium as claimed in claim 1, wherein the component (a) comprises a vinyl chloride-vinyl acetate type resin containing $3 \times 10^{-4}$ to $1 \times 10^{-3}$ equivalents of a carboxyl group per gram of the polymer.

3. A magnetic recording medium as claimed in claim 1, wherein the component (a) comprises a vinyl chloride-vinyl acetate type resin which is a vinyl chloride-vinyl acetate-maleic acid copolymer.

4. A magnetic recording medium as claimed in claim 1, wherein the ratio of the component (a) to the component (b) is in the range of 40:60 to 85:15 parts by weight.

5. A magnetic recording medium as claimed in claim 1, wherein the urethane resin has a molecular weight of 5,000 to 500,000.

6. A magnetic recording medium as claimed in claim 1, wherein the urethane resin has a molecular weight of 10,000 to 20,000.

7. A magnetic recording medium as claimed in claim 1, wherein the component (c) comprises an isocyanate compound having at least two isocyanate groups with the isocyanate groups being modified with an acryloyl groups.

8. A magnetic recording medium as claimed in claim 1, wherein the component (c) comprises aromatic or alicyclic compounds having at least two vinyl linkages contain at least two acryloyl groups.

9. A magnetic recording medium as claimed in claim 1, wherein component (c) is selected from said aromatic or alicyclic compounds containing at least two vinyl linkages in the molecule.

10. A magnetic recording medium as claimed in claim 1, wherein component (c) is selected from said isocyanate compound having at least two isocyanato groups with the isocyanato groups being modified with an acryloyl group and/or a methacryloyl group.

11. A magnetic recording medium as claimed in claim 10, wherein said component (a) is said vinyl chloride-vinyl acetate-type resin.

12. A magnetic recording medium as claimed in claim 1, wherein the component (c) is present in an amount of 20 to 100 parts by weight per 100 parts by weight of the sum of the component (a) and the component (b).

* * * * *